(12) United States Patent
Kirchhübel et al.

(10) Patent No.: US 8,690,973 B2
(45) Date of Patent: Apr. 8, 2014

(54) ENTRAINED FLOW REACTOR FOR GASIFYING SOLID AND LIQUID ENERGY SOURCES

(75) Inventors: Volker Kirchhübel, Freiberg (DE);
Matthias Köhler, Freiberg (DE);
Manfred Schingnitz, Freiberg (DE)

(73) Assignee: Siemens Aktiengesellschaft, München (DE)

( * ) Notice: Subject to any disclaimer, the term of this patent is extended or adjusted under 35 U.S.C. 154(b) by 558 days.

(21) Appl. No.: 11/999,651

(22) Filed: Dec. 6, 2007

(65) Prior Publication Data
US 2008/0141588 A1 Jun. 19, 2008

(30) Foreign Application Priority Data
Dec. 14, 2006 (DE) .......... 10 2006 059 149

(51) Int. Cl.
*B01J 7/00* (2006.01)

(52) U.S. Cl.
USPC .............................................. 48/61

(58) Field of Classification Search
USPC ................................. 48/62 R–62 A
See application file for complete search history.

(56) References Cited

U.S. PATENT DOCUMENTS

| | | | |
|---|---|---|---|
| 2,801,158 A * | 7/1957 | Grossman et al. ........... | 48/78 |
| 4,372,754 A * | 2/1983 | Gernhardt et al. ........... | 48/77 |
| 6,562,102 B1 * | 5/2003 | Kepplinger et al. ........... | 75/445 |
| 2004/0261316 A1 * | 12/2004 | Weaver ........................ | 48/210 |
| 2007/0079554 A1 * | 4/2007 | Schingnitz et al. ............ | 48/210 |

FOREIGN PATENT DOCUMENTS

| | | | |
|---|---|---|---|
| CN | 2004 200 4200 7 | 5/2005 | |
| CN | 2004 100 7336 1 | 6/2006 | |
| DE | 41 09 231 C2 | 9/1992 | |
| DE | 42 41 283 A1 | 6/1994 | |
| DE | 44 46 803 A1 | 6/1996 | |
| DE | 197 18 131 A1 | 11/1998 | |
| DE | 10 2005 048 488 A1 | 5/2007 | |
| EP | 0050863 A1 | 5/1982 | |
| EP | 0 099833 B1 | 2/1984 | |
| EP | 0099833 B1 * | 5/1986 | ............... C10J 3/48 |
| EP | 0400740 B1 | 12/1990 | |

OTHER PUBLICATIONS

Machine Translation of EP0099833B1.*
J. Carl, P. Frita, Noell Conversion Process, EF-Verlag Für Energie und Umwelttechnik GmbH, 1996, p. 33 and p. 73.

* cited by examiner

*Primary Examiner* — Imran Akram

(57) ABSTRACT

There is described a reactor for entrained flow gasification for operation with dust-type or liquid fuels, wherein a number of gasification burners are disposed away from the reactor axis, with the center line of a gasification burner having an oblique position that is other than parallel to the reactor axis, it being possible for said oblique position to extend at different angles up to an angle of 90°. The center line does not necessarily have to intersect the reactor axis; rather the center line can pass the reactor axis at a predetermined distance. This arrangement is associated with a significant reduction in the unwanted discharge of dust-type fine slag, which is difficult to utilize, in conjunction with the possibility of reducing the reactor diameter due to its structure.

3 Claims, 4 Drawing Sheets

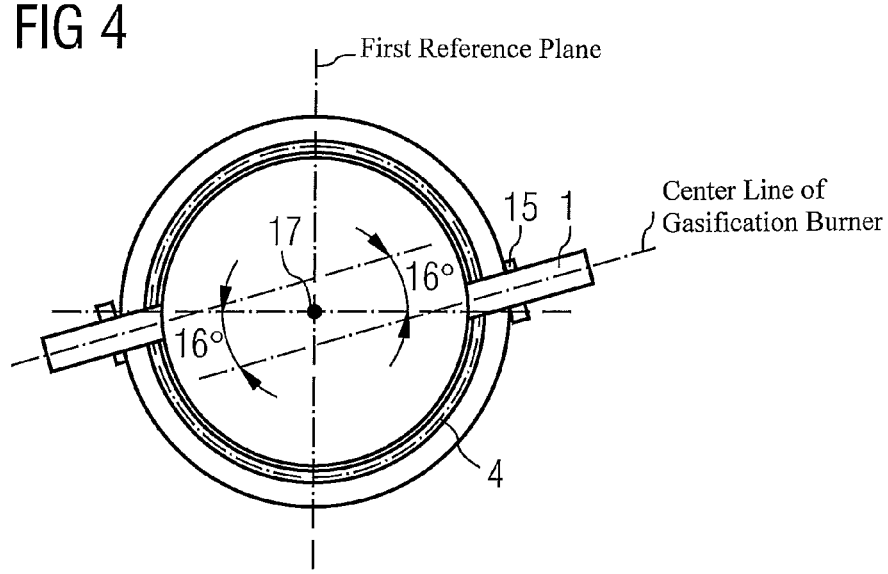

ENTRAINED FLOW REACTOR FOR GASIFYING SOLID AND LIQUID ENERGY SOURCES

CROSS REFERENCE TO RELATED APPLICATIONS

This application claims priority of German application No. 10 2006 059 149.6 DE filed Dec. 14, 2006, which is incorporated by reference herein in its entirety.

FIELD OF INVENTION

The invention relates to a reactor for entrained flow gasification with a differing burner arrangement. Solid and liquid energy sources refer to solid fuels such as coals of different degrees of carbonization and cokes of different origins as well as combustible liquids with specific solid and ash contents and also water, coal or oil-coal suspensions, known as slurries.

BACKGROUND OF INVENTION

The autothermal entrained flow gasification of solid, liquid and gaseous fuels has been known for many years in gas generation technology. The ratio of fuel to gasification agents containing oxygen is selected in such a way that for reasons of quality of the synthesis gas higher carbon compounds are cleaved completely to form synthesis gas components such as CO and $H_2$ and the inorganic constituents are discharged as molten slag (J. Carl, P. Fritz, NOELL-KONVERSIONS-VERFAHREN [NOELL CONVERSION PROCESS], EF-Verlag für Energie-und Umwelttechnik GmbH 1996, p. 33 and p. 73).

Using various systems which have gained acceptance in the field, gasification gas and the molten inorganic fraction, e.g. slag, can be discharged from the reaction chamber of the gasification appliance separately or together, as set out in DE 19718131.7A1.

Both systems which are provided with a refractory lining and cooled systems, as known for example from DE 4446803 A1, have been introduced for internal delimitation of the reaction chamber contour. The gasification burners are disposed at the head, in other words at the top, of the gasification reactor, the flow is oriented downward, gasification gas and slag is discharged through a central opening at the base of the gasification chamber. Such gasification reactors are demonstrated for example in DE 41 09 231 C2 and the Chinese patents 200 4200 4200 7 and 2004 100 73361 of the Northwest Chemical Institute. This reactor, whose gasification burner is likewise located at the head of the reactor, delimits the gasification chamber by means of a refractory lining, in which cooling tubes are embedded. The gasification gas leaves the gasification chamber at its center together with the ash that is molten to slag and is routed by way of a central guide tube into a water bath, in which the hot crude gas and slag are cooled. The cooled crude gas rises up out of the water bath and is removed by way of a pipe. The slag is collected in the water bath and expanded cyclically by way of an air lock and discharged from the gasification system.

EVALUATION OF THE PRIOR ART

The delimitation of the gasification chamber by means of a cooled refractory wall, into which cooling tubes are let, results in very large thermodynamic stresses due to the large temperature differences between the temperature in the gasification chamber and the region of the cooling tubes in the wall. This results in crack formation and rapid destruction and thus to lower availability. Also the conventional structure increasingly causes an unwanted discharge of fine slag to occur in the form of slag dust, which is difficult to utilize, from the gasification chamber. The removal of crude gas and liquid slag results in deposits due to cooling in the guide tube and these deposits can even cause said guide tube to become completely blocked. Crude gas and slag can then no longer be removed from the gasification chamber and the gasification process must be terminated. As a result availability suffers and the solidified hard slag must be removed from the guide tube under difficult conditions.

SUMMARY OF INVENTION

According to the invention these disadvantages are overcome by the solution set out in an independent claim.

According to the invention a number of gasification burners are disposed away from the reactor axis (central axis), with the center line of a gasification burner having an oblique position that is other than parallel to the reactor axis, it being possible for said oblique position to extend at different angles up to an angle of 90°, at which, in other words essentially horizontal in relation to the vertical central axis, the gasification media are introduced into the gasification chamber. The center line does not necessarily have to intersect the reactor axis; rather the center line can pass the reactor axis at a predetermined distance.

This arrangement is associated with a significant reduction in unwanted discharge of dust-type fine slag, which is difficult to utilize.

The functionality of the central tube according to the prior art, which is subject to problems of deposits and associated limited availability, is replaced in the invention by quenching in the free space. Here the quenching chamber remains free of fittings on which deposits may form. The required cooling water is introduced by way of nozzles, which are disposed at regular intervals around the quenching chamber in the region of the pressure envelope.

In a particular refinement of the invention the gasification burners are disposed in such a manner that their center lines intersect the reactor axis above the upper edge of the crude gas and slag outlet, in particular at one point. This allows a reduction in the diameter of the reactor due to its structure.

In a particular refinement of the invention the gasification burners are disposed in such a manner that when projected onto a plane perpendicular to the reactor axis the center line of a respective gasification burner and the radius between reactor axis and entry point of the gasification burner into the gasification chamber form an angle between greater than zero and 16 degrees. This embodiment is advantageous for an arrangement of the gasification burners with an angle around 90°, in other words essentially horizontal in relation to the vertical central axis.

In a particular refinement of the invention the gasification burners and the ignition and pilot burner are disposed in a common burner flange. This embodiment is advantageous for an arrangement of the gasification burners with an acute angle close to zero degrees, in other words essentially parallel to the vertical central axis.

In a particular refinement of the invention a gasification burner is disposed in a separate burner flange. This embodiment is advantageous for an arrangement of the gasification burners with an angle close to 90°, in other words essentially horizontal in relation to the vertical central axis.

BRIEF DESCRIPTION OF THE DRAWINGS

The invention is described in more detail below as an exemplary embodiment to the degree required for understanding, based on figures, in which:

FIG. 4 shows a gasification burner arrangement with the center line away from the reactor axis.

In the figures identical reference characters relate to identical elements.

DETAILED DESCRIPTION OF INVENTION

Example 1

Figure 1:
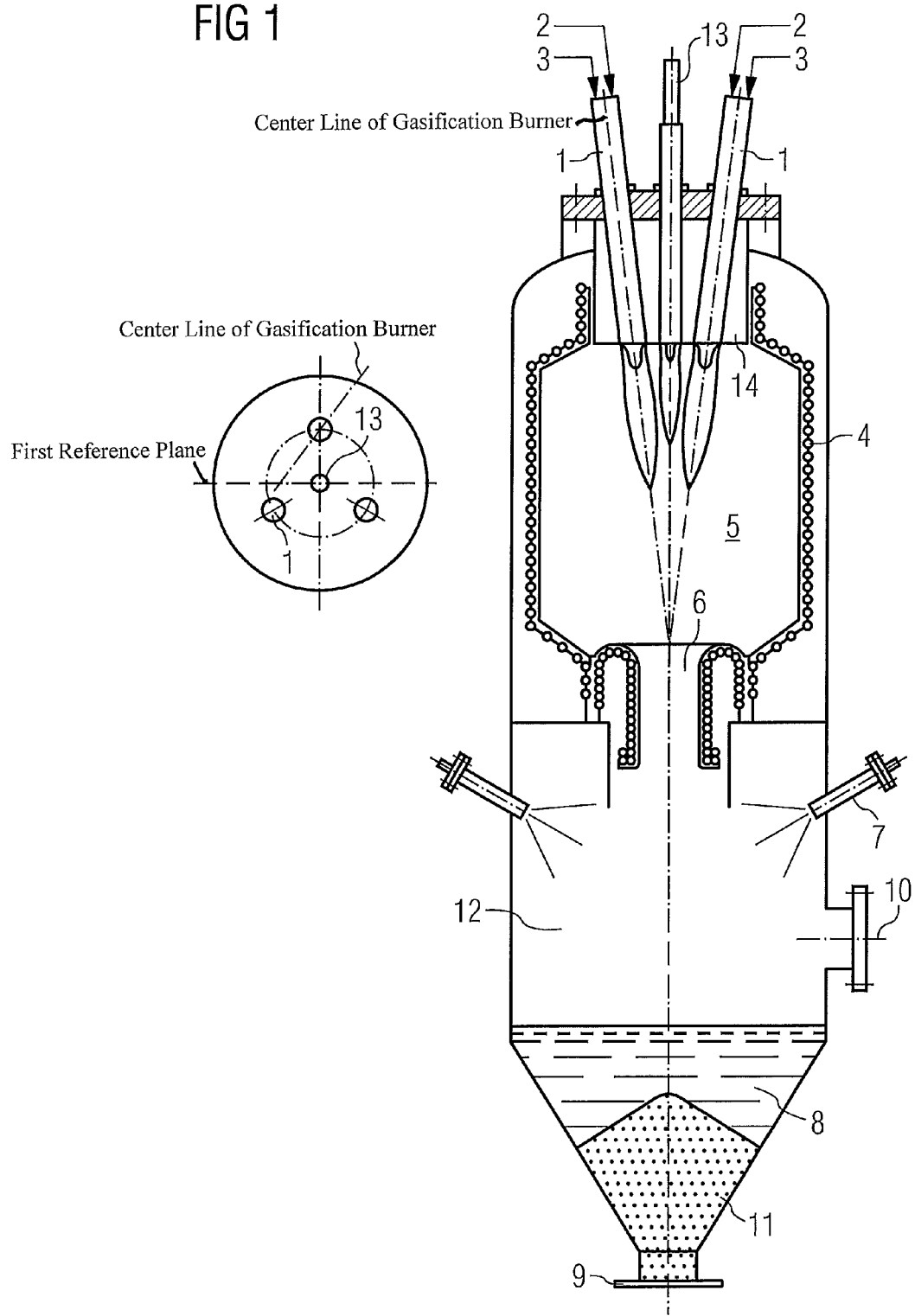
FIG. 1 shows a multiple burner arrangement on a central burner flange.

A Multiple Burner Arrangement on a Central Burner Flange According to FIG. 1

In an entrained flow reactor 300 t/h coal dust 3 with oxygen and steam 2 as the gasification agents are converted to a crude synthesis gas. The gasification temperature is 1,450° C., the gasification pressure 40 bar. An ignition and pilot burner 13 is disposed at the head of the reactor, with three gasification burners 1 symmetrically at a distance of 120°. The coal dust 3 is supplied pneumatically as a coal dust/carrier gas suspension to the gasification burners 1, the conversion takes place in the gasification chamber 5, whose contour is delimited by a cooling screen 4, with the cooling screen being formed by tubes which are welded together in a gastight manner and through which cooling water flows. The hot gasification gas leaves the gasification chamber 5 together with the liquid slag and passes through the crude gas and slag outlet 6 to the quenching chamber 12, into which water is injected by way of the quenching nozzles 7 to cool crude gas and slag. The quenching chamber 12 is free from fittings or other surfaces, which may results in deposits of dust or slag. The slag 11 is deposited in the water bath 8 and is removed by way of the slag discharge 9. The quenched crude gas is saturated with water vapor and leaves the quenching chamber 12 by way of the crude gas outlet 10 to go on to the next cleaning stage. The gasification burners 1 and the ignition and pilot burner 13 are guided into the gasification chamber 5 by way of a burner securing unit 14. The ignition and pilot burner 13 is disposed vertically in the reactor axis, the gasification burners 1 can be disposed parallel to the reactor axis or at such an angle that their center lines meet on the reactor axis of the crude gas and slag outlet 6. In a preferred angle range the angle between the center line of a gasification burner and the parallel line through the entry point of the gasification burner into the gasification chamber differs from the reactor axis by 5 to 30 degrees.

Example 2

Figure 2:
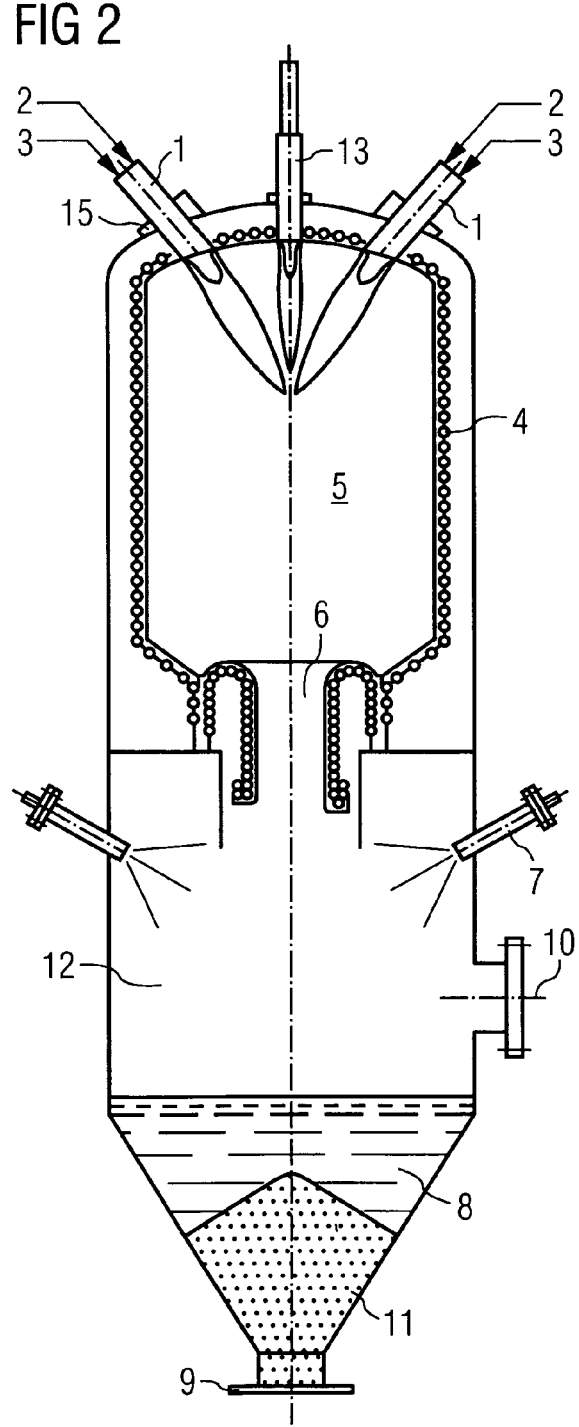
FIG. 2 shows a multiple burner arrangement with individual flanges.

Multiple Burner Arrangement with Individual Flanges According to FIG. 2

The arrangement corresponds in principle to example 1. If the angle between the reactor axis and the axis of the gasification chamber 1 exceeds a specific value, an arrangement on one burner flange 14 is no longer structurally expedient, because it is too large. In this instance the gasification burners 1 are provided with individual flanges. This measure means that the gasification burners 1 can be disposed in any manner, without restrictions in respect of the selection of the angle between reactor and gasification chamber axes.

Example 3

Figure 3:
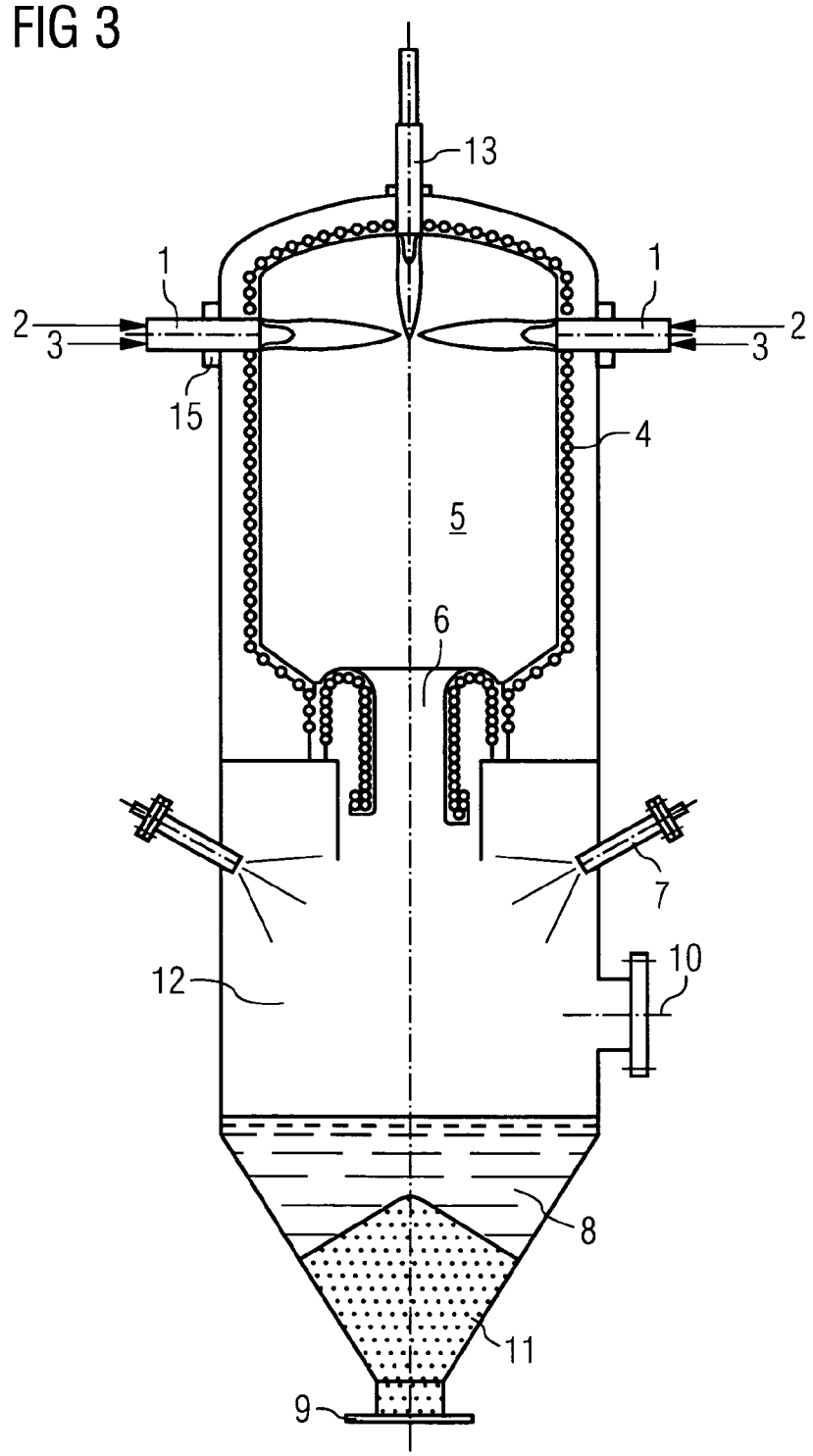
FIG. 3 shows a multiple burner arrangement with individual flanges according to FIG. 3

Multiple Burner Arrangement with Individual Flanges According to FIGS. 3 and 4

The example shows the arrangement of the gasification burners 1 at an angle of 90° to the reactor axis, with the ignition and pilot burner 13 being installed vertically. The gasification burners 1 are positioned opposite each other in pairs, so that the gasification flames are deflected downward toward the reactor axis in the flow direction. The gasification burners 1 are preferably disposed in pairs, in other words 2, 4 or 6 of them. It is also possible to integrate the ignition and pilot burner 12 in one or more gasification burners 1.

The gasification burners 1 can be supplied with dust-type or liquid fuels, with liquid fuels also including suspensions of liquids such as water or oil with fuels ground to dust or inorganic admixtures.

It is also possible to position the gasification burner axes at a specific distance from the reactor axis, as shown in FIG. 4. Here a gasification burner is disposed in such a manner that when projected onto a plane perpendicular to the reactor axis the center line of the gasification burner and the radius between reactor axis and entry point of the gasification burner into the gasification chamber form an angle 16 between 0 and 30 degrees. The axes of the gasification burners 1 therefore do not meet on the reactor axis 17 but form an angle 16, which can be up to 30°. A preferred range for this angle is 3 to 25 degrees. The gasification flames of gasification burners disposed opposite each other are advantageously transposed in relation to each other here.

The ignition and pilot burner 13 can also be integrated in one or more dust burners (gasification burners 1). This embodiment means that it is not necessary to have a separate flange for the ignition and pilot burner.

A particular embodiment of the invention results from a method for the entrained flow gasification of dust-type or liquid fuels, with liquid fuels referring to oils or oils containing solids as well as suspensions of water or oil with finely ground fuels or inorganic admixtures at pressures between ambient pressure and 80 bar as well as gasification temperatures between 1,200 and 1,900° C. with a gasification agent containing free oxygen An arrangement of an ignition and pilot burner 13 as well as a number of gasification burners 1 on a common burner flange 14 at the head of the gasification chamber 5, An arrangement of the ignition and pilot burner 13 in the reactor axis and the gasification burners 1 parallel to the reactor axis or at such an angle to it that the gasification burner axes meet on the reactor axis at the level of the upper edge of the crude gas and slag outlet 6, Conversion of the fuel in a free gasification chamber 5, which is delimited by a cooling screen 4, which is formed by tubes which are welded together in a gastight manner and through which cooling water flows, Diversion of crude gas and liquid slag 6 into a quenching chamber 12, which is configured to be free from fittings as a free space quencher, and injection of an excess of quenching water by way of the nozzles 7, Cooling and saturation of the crude gas with water vapor and removal to subsequent treatment stages and Collection of the cooled slag 11 and the excess water 8 in the sump of the quenching chamber 12 and periodic removal to a discharge lock.

A particular embodiment of the invention results from a method for the entrained flow gasification of dust-type or liquid fuels, with liquid fuels referring to oils or oils containing solids as well as suspensions of water or oil with finely ground fuels or inorganic admixtures at pressures between ambient pressure and 80 bar as well as gasification temperatures between 1,200 and 1,900° C. with a gasification agent containing free oxygen, comprising An arrangement of an ignition and pilot burner 13 as well as a number of gasification burners 1 in the region of the reactor with individual burner flanges 15, An arrangement of the ignition and pilot burner 13 in the reactor axis and the gasification burners 1 in such a manner that the gasification burner axes meet on the reactor axis above the upper edge of the crude gas and slag outlet 6 and form an angle of maximum 90° to the reactor axis, Conversion of the fuel in a free gasification chamber 5, which is delimited by a cooling screen 4, which is formed by tubes which are welded together in a gastight manner and through which cooling water flows, Diversion of crude gas and liquid slag 6 into a quenching chamber 12, which is configured to be free from fittings as a free space quencher, and injection of an excess of quenching water by way of the nozzles 7, Cooling and saturation of the crude gas with water vapor and removal to subsequent treatment stages and Collection of the cooled slag 11 and the excess water 8 in the sump of the quenching chamber 12 and periodic removal to a discharge lock.

The invention claimed is:

1. A reactor for entrained flow gasification for operation with dust-type or liquid fuels, comprising:
   a gasification chamber;
   at least three gasification burners disposed in an essentially rotationally symmetrical manner in relation to a reactor axis;
   an ignition and pilot burner arranged in the reactor axis,
   wherein each gasification burner is disposed in an upper region of the gasification chamber,
   wherein the reactor axis lies along a first reference plane,
   wherein a second reference plane is arranged perpendicular to the first reference plane and the reactor axis,
   wherein the second reference plane passes through an entry point of each gasification burner respectively into the gasification chamber, and
   wherein a center line of each gasification burner intersects the first reference plane within the gasification chamber as well as between a level of the entry point of the gasification burner into the gasification chamber and an upper edge of a crude gas outlet and a slag outlet such that the center lines of the gasification burners are non-parallel to the reactor axis,
   wherein each gasification burner is arranged such that the center lines of the gasification burners do not meet on the reactor axis, wherein the center line of each gasification burner and the first reference plane form an angle between 0 and 30 degrees, and
   a quenching chamber connected to the gasification chamber via the crude gas outlet and the slag outlet.

2. The reactor as claimed in claim 1, wherein the reactor is for use of liquid fuels referring to oils or oils containing solids as well as suspensions of water or oil with fuels ground to dust or inorganic admixtures, at pressures between ambient pressure and 80 bar, gasification temperatures between 1,200 and 1,900° C., as well as with a gasification agent containing free oxygen.

3. The reactor as claimed in claim 2, wherein each gasification burner has a separate burner flange.

* * * * *